(12) United States Patent
Hu

(10) Patent No.: US 7,708,598 B2
(45) Date of Patent: May 4, 2010

(54) ELECTRICAL CARD CONNECTOR WITH AT LEAST A CARD LOCKING MECHANISM

(75) Inventor: Yong-Hui Hu, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/387,039

(22) Filed: Apr. 27, 2009

(65) Prior Publication Data

US 2009/0269964 A1    Oct. 29, 2009

(30) Foreign Application Priority Data

Apr. 25, 2008    (CN) .................... 2008 2 0035606 U

(51) Int. Cl.
*H01R 24/00* (2006.01)

(52) U.S. Cl. .................. 439/630; 439/188; 439/607.33

(58) Field of Classification Search ................ 439/188, 439/607.31–607.34, 630, 945
See application file for complete search history.

(56) References Cited

U.S. PATENT DOCUMENTS

| 7,125,258 | B2 * | 10/2006 | Nakakubo et al. | 439/64 |
| 7,488,214 | B2 * | 2/2009 | Tanaka et al. | 439/630 |
| 7,517,237 | B2 * | 4/2009 | Ting | 439/159 |
| 7,621,783 | B1 * | 11/2009 | Lai | 439/630 |

\* cited by examiner

*Primary Examiner*—Khiem Nguyen
(74) *Attorney, Agent, or Firm*—Ming Chieh Chang; Wei Te Chung

(57) ABSTRACT

A card connector, comprising: an insulative housing having a base, a pair of first and second raised sidewalls, and third raised sidewalls to form a receiving cavity therebetween, an insertion opening located opposite to said third raised sidewall, said base having thereon a window, each of said first and second raised sidewalls having a resilient locking arm invading laterally toward said receiving cavity; a contact module disposed within said window of the housing with a plurality of contact sections extending above a top face of the base; a metal shielding member assembled to the housing, the metal shielding member having resilient reinforcement pieces respectively located outside of said resilient locking arms.

6 Claims, 5 Drawing Sheets

ELECTRICAL CARD CONNECTOR WITH AT LEAST A CARD LOCKING MECHANISM

BACKGROUND OF THE INVENTION

1. Field of the Invention

The present invention relates to an electrical card connector, and more particularly, to an electrical card connector provided with card locking mechanisms for making the card stable in the electrical card connector to prevent the electrical card from dropping out.

2. Description of Related Art

Electrical cards are known in the art and contain intelligence in the form of a memory circuit or other electronic program. Some form of card readers retrieve the information or data stored on the card. Such cards are used in many applications in today's electronic society, including video cameras, digital still cameras, smart phones, PDAs, music players, ATMs, cable television decoders, toys, games, PC adapters, multi-media cards and other electronic applications, etc.

Example of prior art card-receiving connectors as patent CN 2563786 of Chinese mainland comprises an insulative housing; a plurality of contacts received in the insulative housing; a retention mechanism defined in the sidewall of the insulative housing. A locking section defined on the retention mechanism protrudes into the card receiving space. A notch is defined on a side of the electrical card corresponding to the locking section of the retention mechanism. When the electrical card is completely inserted into the card-receiving connector, the locking section keeps a good retention with the notch; the electrical card is retained in the card-receiving connector well. But the plastic deformation of the locking section is always affected by amounts of the inserting force. In other words, too great inserting force will cause the plastic locking section broken, and thereby lead to an unstable retention between the locking section and the notch of the card.

Therefore, an improved electrical card connector is desired to overcome the disadvantages of the prior arts.

SUMMARY OF THE INVENTION

An object, therefore, of the invention is to provide a new and improved an electrical card connector having a reinforcement member reinforcing the plastic locking section for preventing the plastic locking section from being broken.

In order to achieve the above-mentioned object, an electrical card connector comprises: an insulative housing having a base, a pair of first and second raised sidewalls, and third raised sidewalls to form a receiving cavity therebetween, an insertion opening located opposite to said third raised sidewall, said base having thereon a window, each of said first and second raised sidewalls having a resilient locking arm invading laterally toward said receiving cavity; a contact module disposed within said window of the housing with a plurality of contact sections extending above a top face of the base; a metal shielding member assembled to the housing, the metal shielding member having resilient reinforcement pieces respectively located outside of said resilient locking arms.

Other objects, advantages and novel features of the present invention will become more apparent from the following detailed description of the present embodiment when taken in conjunction with the accompanying drawings.

DETAILED DESCRIPTION OF THE INVENTION

Reference will now be made in detail to the preferred embodiment of the present invention.

Figure 1:
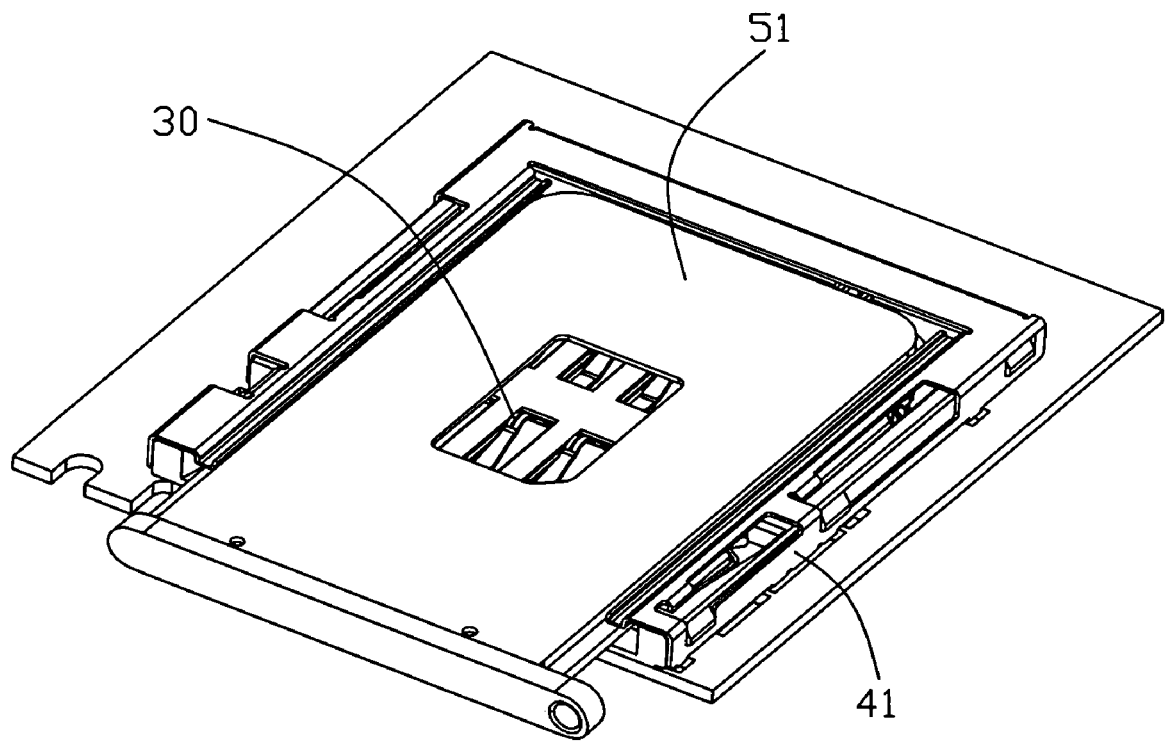
FIG. 1 is an assembled, perspective view of the present invention.
Figure 2:
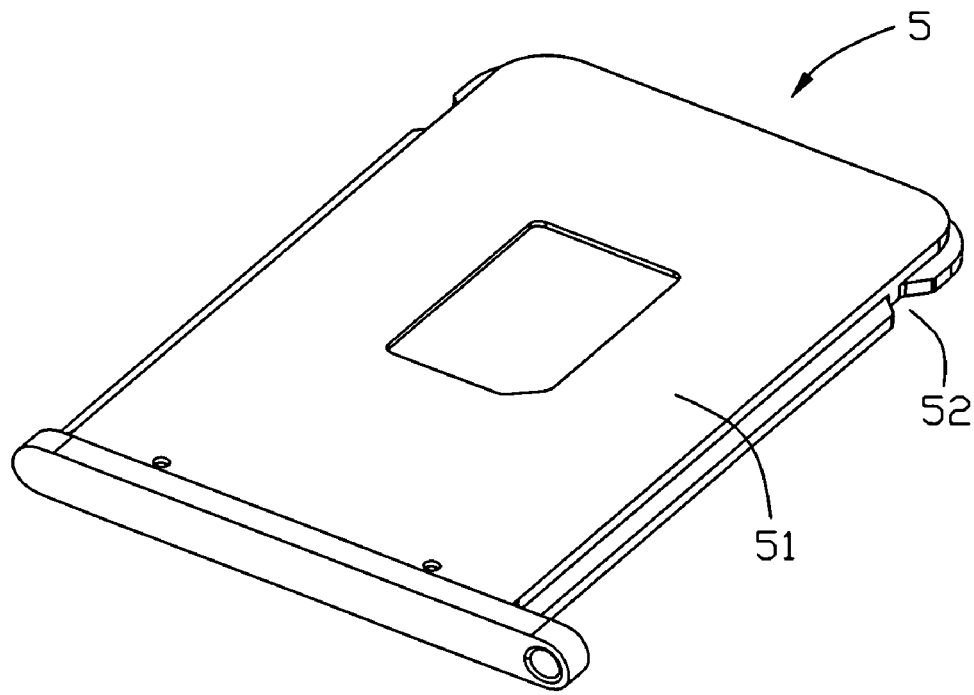
FIG. 2 is a partly-exploded, perspective view of the electrical card connector as shown in FIG. 1.
Figure 2:
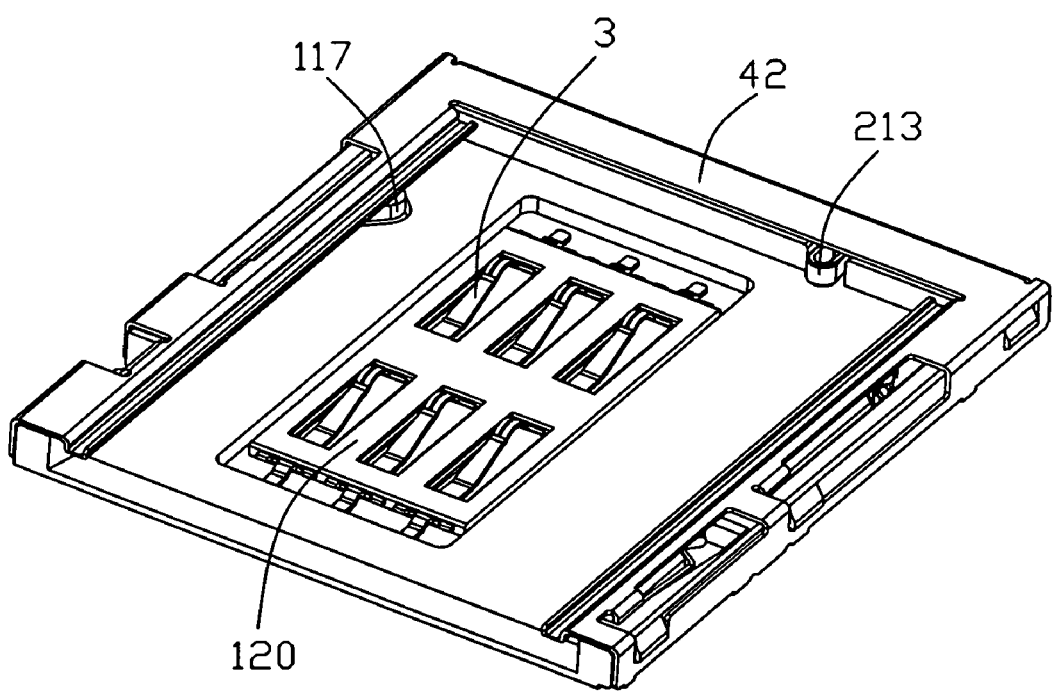
Figure 3:
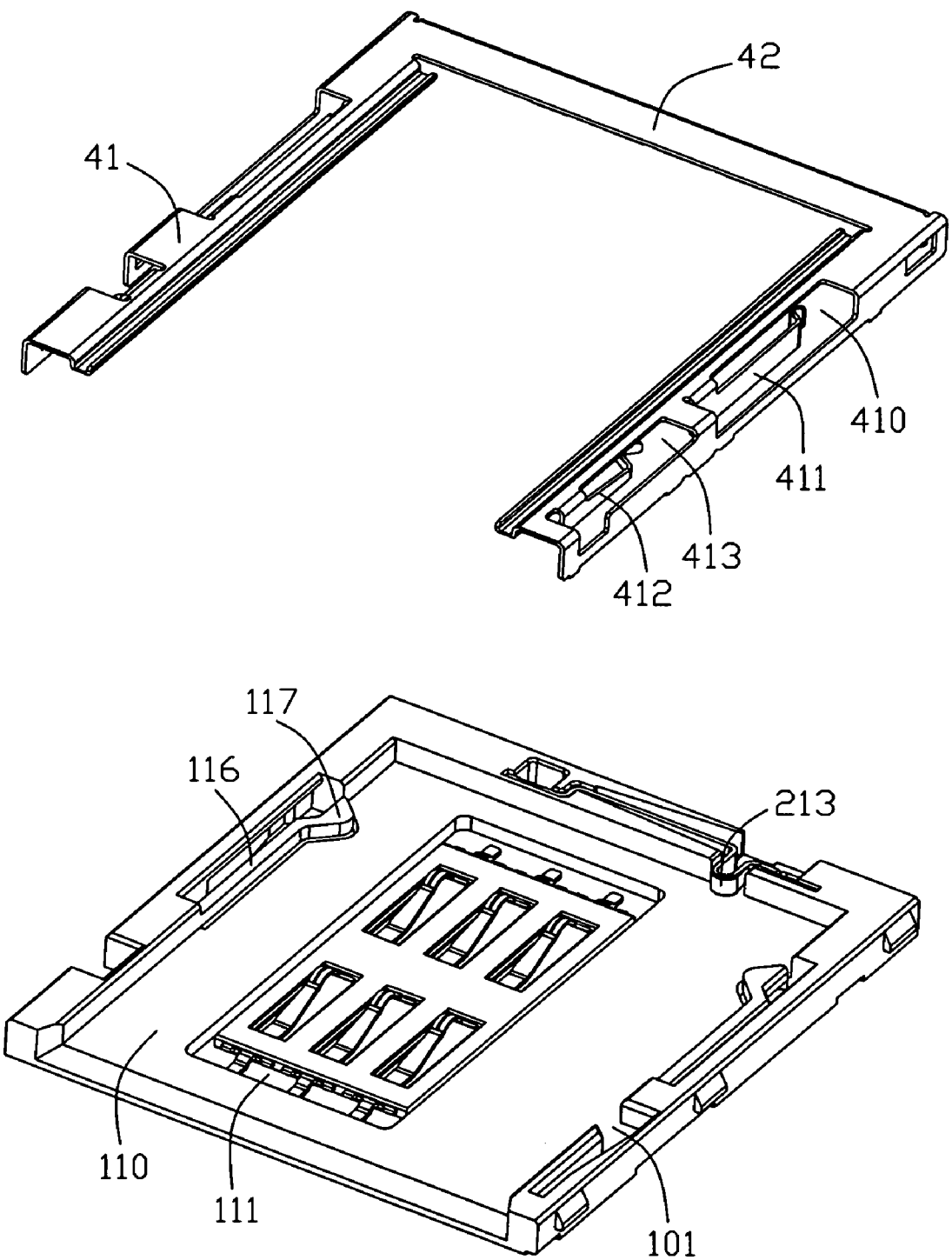
FIG. 3 is a partly-exploded, perspective view of the electrical card connector as shown in FIG. 1 without the card receiving mechanism.
Figure 4:
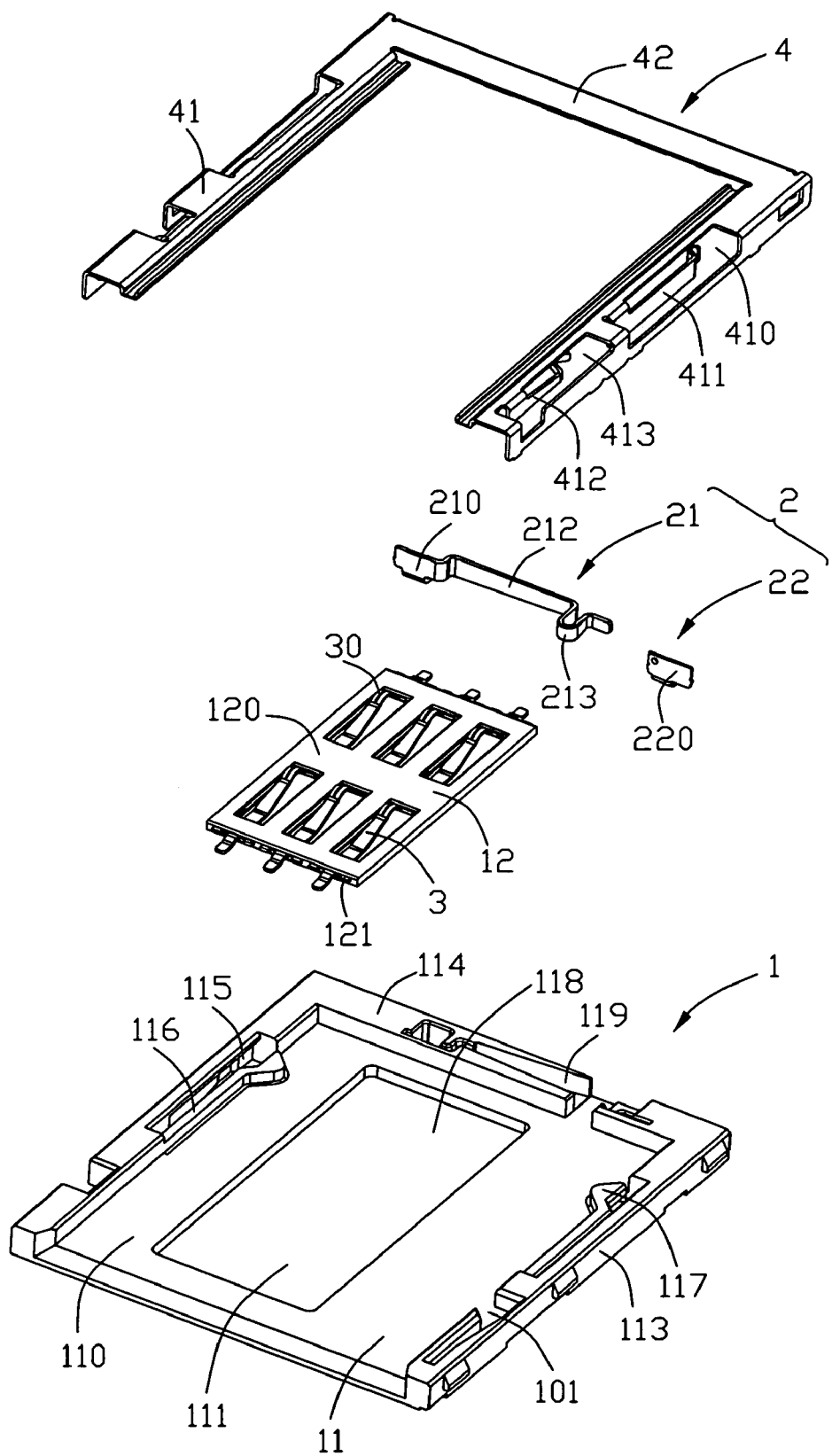
FIG. 4 is an exploded, perspective view of the electrical card connector as shown in FIG. 1, without the card receiving mechanism.
Figure 5:
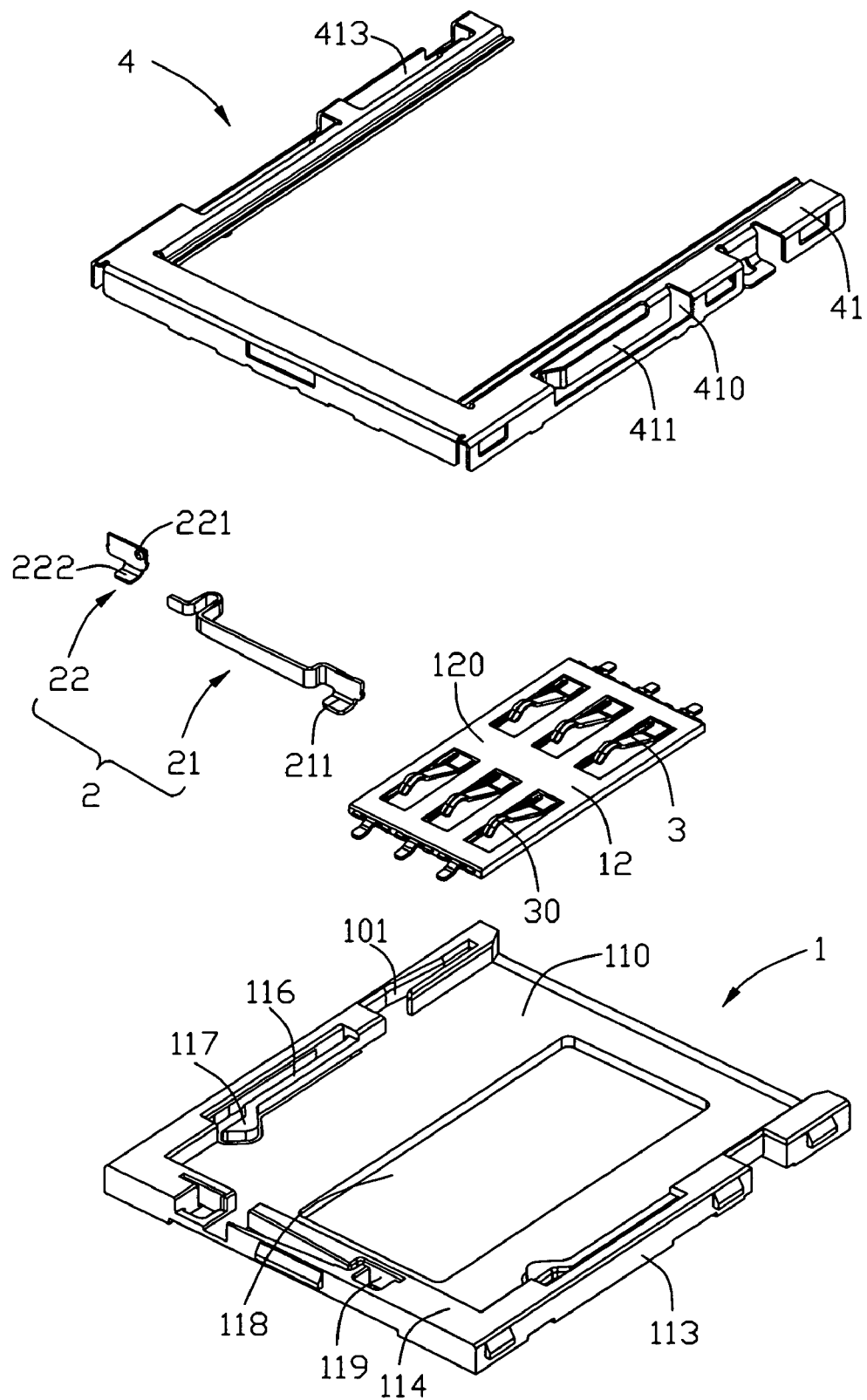
FIG. 5 is an exploded, perspective view of the electrical card connector as shown in FIG. 1 from another aspect, without the card receiving mechanism.

Referring to FIGS. 1-2, an embodiment of the present invention illustrated. An electrical card connector for electrically connecting an electrical card comprises an insulative housing 1 with a plurality of contacts 3 assembled therein; a detecting switch 2 defined in the insulative housing 1; a shield shell 4 covering the insulative housing 1; and a card receiving mechanism 5.

The insulative housing 1 comprises an insulative frame 11 and a terminal receiving plate 12. The insulative frame 11 includes a fundamental base 110 with an opening 111 defined therethrough. A pair of sidewalls 113 extends from two opposite sides of the fundamental base 110 with a back wall 114 defined therebetween. A receiving space 118 is defined by the sidewalls 113 and the back wall 114. Each sidewall 113 has a first groove 115 defined thereon, a beam section 116 defined in and extends along the first groove 115. A locking section 117 is defined on the free end of the beam section 116 and protrudes into the receiving space 118. A receiving slot 119 is defined on the back wall 114 and receives the detecting switch 4. A second groove 101 is defined on a sidewall 113 adjacent to the first groove 115. The terminal receiving plate 12 includes a receiving plate 120 with a plurality of passageways 121 defined thereon. The passageways 121 receive the contacts 3.

The detecting switch 2 includes a movable switch 21 and a stationary switch 22. The movable switch 21 has a first plate 210, and a first soldering tail 211 extends from a side of the first plate. An extending section 212 is defined on the side adjacent to the first soldering tail 211 of the first plate 210. A first contact section 213 is defined on the free end of the extending section 212. The stationary switch 22 has a second plate 220 with a dimple 221 defined thereon. A second soldering tail 222 extends from a side of the second plate 220.

The contact 3 has a third contact section 30 defined above the terminal receiving plate 12.

The shield shell 4 defines a pair of side frame 41 and a connect frame 42 therebetween. Each side frame 41 has a cutout 410 running through the side frame 41. A spring arm 411 cooperating with the locking section 117 for functioning as the reinforcement piece, is defined in the first cutout 410 in according to the beam section 116 so that the beam section 116 with the locking section 117 and the associated spring arm 411 commonly defines a locking mechanism for locking the card receiving mechanism 5 in the receiving cavity. A retention arm 412 is defined in the second cutout 413 for resiliently retaining the card receiving mechanism 5.

The card receiving mechanism 5 includes a receiving plate 51, and a pair of depression 52 is defined on the opposite sides of the receiving plate 51 symmetrically in accordance with the locking section 117 of the insulative housing 1.

When the card receiving mechanism 5 is completely inserted into the receiving space 118, the locking section 117 which protruding into the receiving space 118 is retained in the depression 52. The retention arm 412 keeps a resiliently touch with the side of the receiving plate 51 for a stable retention between card receiving mechanism 5 and the insulative housing 1.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, comprising: an insulative housing having a base, a pair of first and second raised sidewalls, and a third raised sidewall to form a receiving cavity therebetween, an insertion opening located opposite to said third raised sidewall, said base having thereon a window, each of said first and second raised sidewalls having a resilient locking arm invading laterally toward said receiving cavity; a contact module disposed within said window of the housing with a plurality of contact sections extending above a top face of the base; a metal shielding member assembled to the housing, the metal shielding member having resilient reinforcement pieces respectively located outside of said resilient locking arms, wherein one of the first raised sidewall and the second raised sidewall defines a second groove, the metal shielding member includes a second resilient reinforcement piece locating in the second groove, a holding section is defined on the free end of the second resilient reinforcement piece, wherein the card connector further includes a detecting switch, said detecting switch includes a movable switch and a stationary switch.

2. The card connector as described in claim 1, wherein the inner side of each of the first and second raised sidewalls defines a first groove extending lengthwise, each resilient locking arm is defined in the first groove extending along the groove, a first locking section is defined on the free end of the resilient locking arm protruding into the receiving cavity.

3. The card connector as described in claim 1, wherein the resilient locking arms are defined symmetrically with the insulative housing.

4. The card connector as described in claim 1, wherein the resilient reinforcement piece is parallel with the resilient locking arm.

5. An electrical card connector comprising: an insulative housing having a base with a plurality of side walls cooperating with the base to commonly define a card receiving cavity; a plurality of contacts disposed in the base with contact sections extending into the card receiving cavity; a metallic shielding member attached to the housing; and a locking mechanism defining a first elastic arm unitarily formed with the housing and a second elastic arm unitarily formed with the shielding member under condition that the first elastic arm and the second elastic arm are intimately positioned with each other; wherein one of said first elastic arm and said second elastic arm includes a locking section invading the card receiving cavity for receivable engagement within a notch of a card receiving mechanism which is inserted into the card receiving cavity, wherein said base defines an opening receiving a terminal module where said contacts are located, wherein said shielding member includes a frame defining a cutout in a side face thereof, and the second elastic arm is located in said cutout.

6. The electrical card connector as claimed in claim 5, wherein the locking section is formed on the first elastic arm, and the second elastic arm is located outside of the first elastic arm.

* * * * *